Sept. 30, 1941.  T. JUNGMAYR  2,257,689
MACHINE FOR MANUFACTURING BAGS
Filed June 15, 1940  6 Sheets-Sheet 1

Inventor
Theodor Jungmayr
his Atty.

Sept. 30, 1941.　　　T. JUNGMAYR　　　2,257,689
MACHINE FOR MANUFACTURING BAGS
Filed June 15, 1940　　　6 Sheets-Sheet 2

Inventor
Theodor Jungmayr
by Otto Munk
his ATTY.

Sept. 30, 1941. T. JUNGMAYR 2,257,689
MACHINE FOR MANUFACTURING BAGS
Filed June 15, 1940 6 Sheets-Sheet 3

Inventor
Theodor Jungmayr
his Atty.

Inventor
Theodor Jungmayr
By Otto Munk
his Att'y.

Sept. 30, 1941.   T. JUNGMAYR   2,257,689
MACHINE FOR MANUFACTURING BAGS
Filed June 15, 1940   6 Sheets-Sheet 5

Inventor
Theodor Jungmayr
By Otto Munk
his Atty.

Sept. 30, 1941. T. JUNGMAYR 2,257,689
MACHINE FOR MANUFACTURING BAGS
Filed June 15, 1940 6 Sheets-Sheet 6

Inventor
Theodor Jungmayr
By Otto Munk
his Atty.

Patented Sept. 30, 1941

2,257,689

UNITED STATES PATENT OFFICE 2,257,689

MACHINE FOR MANUFACTURING BAGS

Theodor Jungmayr, Stuttgart, Germany, assignor to the firm Fr. Hesser, Maschinenfabrik-Aktiengesellschaft, Stuttgart-Bad Cannstatt, Germany Application June 15, 1940, Serial No. 340,762
In Germany March 3, 1939

10 Claims. (Cl. 93—12)

This invention relates to machines for manufacturing wrapping bags of the type in which a suitably cut piece of paper, cardboard, or similar material, is first folded around a folding block or mandrel in tube-shape and glued in the longitudinal seam, then that end of the tube which is to form the bottom of the bag is folded and glued and the bag is stripped off the folding block.

In known machines of the type referred to, the cutting for forming the bag is conveyed to a table mounted below the folding block to move up and down. This table is provided with a central resilient pressing plate and with two lateral pushers. The table with the cutting is lifted against the folding block, the resilient pressing plate being held back when engaging the bottom side of the folding block, but at the same time pressing the central part of the cutting against the bottom part of the folding block, whereupon the two lateral pushers or folders are moved further upwards pressing both sides of the cutting against the longitudinal sides of the folding block, whilst both ends of the cutting protrude beyond the upper edge of the folding block. These two ends are now folded on the upper side of the folding block by two folders arranged above the folding block. One end of the cutting is longer so that after the folding of these two cutting ends a longitudinal seam is produced which is glued fast by a gummed strip previously applied to the edge of one cutting end. Whilst the folder which has folded the last flap is moved back, a special pressing bar is lowered upon the longitudinal seam and forces the same to lie against the upper side of the folding block so that the gummed strip is given the time required for bonding the two cutting ends. Meanwhile the table with the central pressing plate and the lateral pushers has been returned into its lower working position for receiving the subsequent paper cutting.

A defect of the hitherto known machines of this type consists in that the lateral pushers of the folding table during their downward movement are constantly in contact with the folded sides of the cutting until they leave the folding block on the bottom side. The resulting disadvantage consists in that, owing to the surfaces touching each other, a frictional resistance is produced between the descending pushers and the adjacent parts of the cutting. This frictional resistance may continue more or less severely against the upper end parts of the cutting so that these, owing to the frictional influence, may also be forced downwards and thus the proper manufacturing of the paper tube may be prevented, or at least affected. In this way, the manufacturing of an exactly rectangular shape of the bags as well as a clean and tight closing at the bottom and, after filling the bags, at the upper end would be seriously hampered.

It is an important object of the invention to avoid this disadvantage, and with this object in view, an important feature of the present invention consists in that both lateral pushers of the folding table are moved laterally away from the folding block towards outside, after the table has been raised for folding the sides of the cutting and are returned in this position towards below into their initial position.

It is a further important feature of the present invention that in order to avoid the contact of surfaces between the lateral pushers and the cutting sides also during the upward movement of the pushers, the latter are provided with a concave indentation at their upper ends so that when the pushers are moved upwards only the edges will contact continuously with the cutting sides to be folded. The pushers are advantageously made of an elastic material, like spring steel, and are so adjusted that they exert only a slight pressure upon the side surfaces of the cutting to be folded against the sides of the folding block. By reason of these aforesaid features, smearing of the cutting during the folding operation is also avoided.

Advantageously, the pusher for that side of the cutting which after the U-shaped folding of the cutting protrudes with one longer end beyond the upper side of the folding block is provided so much higher than the other pusher that with its upper curve it protrudes somewhat beyond the upper edge of the folding block shortly before the upward movement of the pushers is finished. This end of the cutting thus is placed in an inclined position towards the folding block so that the upper pusher engaging the same can readily grasp and fold it to the upper side of the folding block. This feature is of special importance when cuttings of a less substantial quality of paper are used tending to bend away from the folding block towards outside so that the cutting cannot securely be grasped by the upper pusher.

According to a further substantial characteristic of the present invention the upper pusher which serves to fold the cutting end forming the upper flap of the longitudinal bag seam is pressed perpendicularly against the longitudinal bag seam in its folding or final position, independent of its drive, until the ready bag is pushed from the folding block. Since the pressing of the longitudinal seam of the bag is effected by the pusher itself, it will not be necessary to provide for each folding block a special pressing device for the longitudinal seam, as has hitherto been found expedient in order to warrant careful glueing and binding of the longitudinal seam. This substantial characteristic above described also saves the time formerly required for the upward movement of this pusher and the fitting of the pressing device for the longitudinal seam, thus rendering the machine more efficient. Since the pusher sits upon the longitudinal seam uniformly and is steadily holding same under pressure after the folding has been completed, any shock or noise which was formerly caused by the violent mounting of the special pressing device upon the folding block will positively be eliminated.

The invention will be better understood by reference to the following detailed description in connection with the accompanying drawings showing by way of example and purely schematically some embodiments of the invention and in which—

Similar characters of reference denote similar parts in the different figures.

Referring now to the drawings in greater detail, it will be seen that the machine has eight folding blocks 25. It will be understood that the machine may be constructed so as to have a smaller or larger number of such folding blocks and the present invention is applicable also to machines having one folding block only.

The folding blocks can be supported in any suitable manner. In the embodiment illustrated, the folding blocks 25 have been arranged in a circle like the spokes on a wheel 5. The folding block support can also be designed in any other manner, for example, to take the shape of an endless chain. In this case the folding blocks are attached to the various links of the chain which is stretched over two sprocket wheels one of which is being driven.

By means of a hub 6 and key 7 the folding block 5 is attached to a vertical shaft 2 which is mounted to rotate in bearings 3 and 4 of the machine frame 1. The folding block is moved by the shaft 2 step by step so that the single blocks are moved successively to the eight stations I-VIII. A Maltese wheel 8, the hub 9 of which has been securely fixed to the shaft 2 by the key 10, serves to move the shaft 2 step by step. A crank 11 having a roller 13 mounted to revolve on the crank pinion 12, is attached to a shaft 14 which rests in the two bearings 15 and 16. A bevel gear 17 which engages with the perpendicular bevel gear 18 is also mounted on shaft 14. The bevel gear 18 is attached to drive shaft 19 which rests in bearings 20 and 21 and is constantly rotated in a suitable manner by an electromotor, not shown, or by a pulley fastened on the shaft. The crank shaft 14 with the crank 11 attached to it is rotated by the bevel gears 18, 17, whilst the roller 13 after one revolution engages one of the radial slots 8a of the Maltese drive 8 moving the same forward by a predetermined angle. Thus also the various folding blocks 25 are subsequently moved to the respective operating stations I-VIII.

After a finished bag on a preceding station has been removed from the folding block by a stripping device to be described later, the folding block is first moved to the operating station I, where the cutting is fed and folded into the shape of a tube around the folding block.

Figure 3:
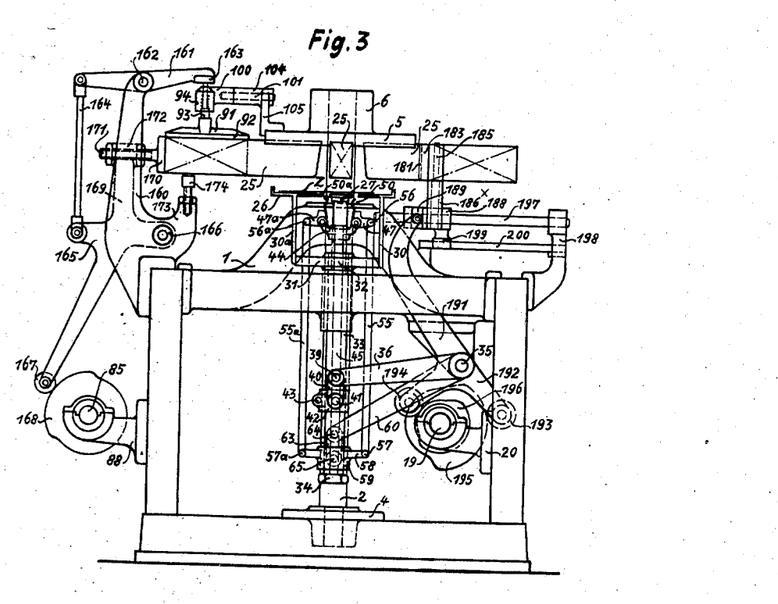
Fig. 3 is a side view of the machine, similar to Fig. 1, but showing different parts of the machine.
Figure 4:
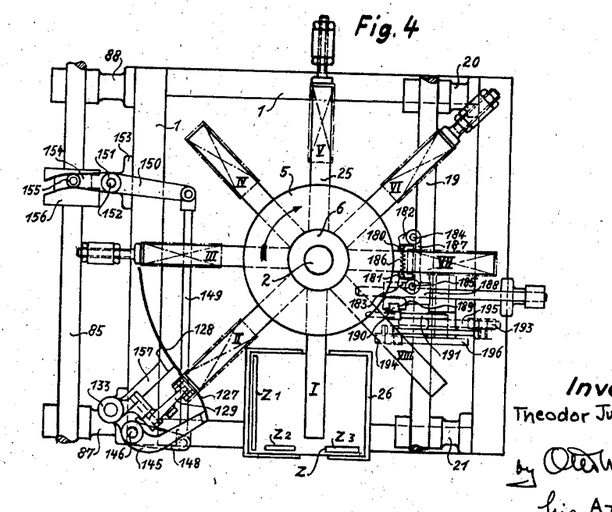
Fig. 4 is a plan view of the machine.
Figures 5, 6:
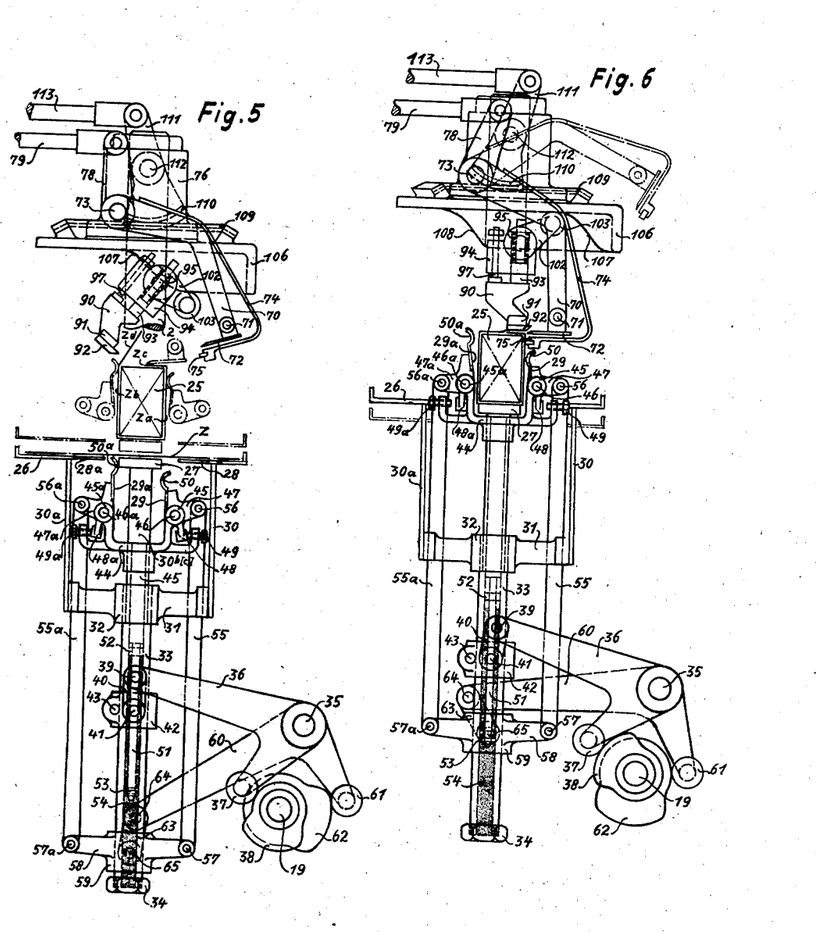
Fig. 5 is a side view of the device for folding the bag cutting tube-like around the folding block, drawn to a larger scale.
Fig. 6 is a similar view, showing different positions of the parts.

Referring to Figs. 3, 5 and 6, a table 26 upon which a cutting Z is to be laid is arranged below the folding block 25 at the operation station I. The cutting Z may be placed upon the table alternatively by a suction device of known type which lifts the uppermost cutting from a pile and places it upon the table, or by drawing the paper from a roller by a known device and moving it to the table 26, where the front end in the shape of the cutting is clipped off. The cutting has been provided with gummed strips Z1 for glueing the longitudinal seam and with gummed strips Z2 and Z3 for glueing the bottom folds of the bag, as shown in Fig. 4. The table 26 has a central recess to accommodate the pressing plate 27 as well as two more recesses 28 and 28a allowing the two pushers 29 and 29a to protrude. The table 26 is supported by two flat irons 30 and 30a and the pressing plate 27 is held by the flat irons 30b and 30c. These flat irons are attached by their bottom ends to a yoke 31 so that the surface of the pressing plate 27 lies exactly flush with the surface of the table 26. By a hub-shaped part 32 the yoke 31 is fastened to the upper end of a movable pipe 33 which at its bottom end is closed by a cap nut 34. The two-arm lever 36 which is connected with a split bushing 42 by means of the pinion members 39, 40, 41, is mounted on the shaft 35 and serves to move the pipe 33 upwards and downwards. The split bushing 42 is fastened to the pipe 33 by a clamp screw 43. The remaining arm of the lever 36 has a roller 37 and by means of a spring, not shown, said roller is held in contact with a cam 38 mounted on the driving shaft 19.

The pushers 29 and 29a are mounted to swing in and out on a forked supporting member 44 which is fastened to the upper end of a rod 45 mounted to slide up and down within the pipe 33. The supporting member 44 at its forked ends is provided with clamps 45 and 45a in which the three-arm levers 47 and 47a are mounted to revolve, by means of pins 46 and 46a. The pushers 29 and 29a are fastened to the upper arms of the levers. In order to provide means of adjusting the swinging motion of the pushers, stops 48 and 48a have been fastened to the lower arms of the levers. These stops strike against screw buffers 49 and 49a, Fig. 5, which are adjustable in the angular braces of the supporting member 44.

The pushers 29 and 29a are advantageously provided with a concave indentation 50 and 50a at their upper ends. The pusher 29a is designed a little longer than the pusher 29 so that in its upper position, as indicated by the dotted line on Fig. 5, it will with its indentation 50a extend somewhat beyond the upper edge of the folding block 25.

A rod 51 having a smaller diameter is connected to the bottom end of the rod 45. The rod 51 is provided at its upper end with a packing 52 of any suitable type and at its bottom end with a valve piston 53 of known design. The tube 33 below the packing 52 and extending to the closing cap screw 34 is filled with oil 54 which by means of the valve piston 53 acts as a brake upon the rod 45.

The rail guides 55 and 55a serve to move the pushers 29 and 29a upwards and downwards as well as sideways. These rail guides are connected at their upper ends with the lateral arms of levers 47 and 47a by means of pinions 56 and 56a and at their bottom ends with the yoke 58 by means of pinions 57 and 57a. This yoke is arranged to slide with its hub 59 on the lower part of the tube 33. The two-armed lever 60 which rests upon the shaft 35 serves to move the yoke 58 upwards and downwards. The lever 60 by means of a roller 61 can be moved up and down from a cam 62 which is mounted on the driving shaft 19. The lever 60 is also connected by means of a pinion 64 with a joint 63 which at its lower end is fastened to the hub 59 of the yoke 58 by means of pinion 65.

Folders 72 and 92 are arranged above the folding block 25 and serve to fold the flaps Zc and Zd which after the shaping in U-form of the cutting Z protrude beyond the upper edge of the folding block, upon the upper surface of the folding block and thus form the upper longitudinal seam of the bag The folders 72 and 92 may be arranged to move along a straight line. In the present case they are swingably mounted by means of levers 70 and 90. Only one folder 72 has been provided which is mounted rigidly on station I. On the other hand, each of the folding blocks has its own folder 92 so that the folders 92 move along with the folding blocks.

The lever 70 of the stationary folder 72 is mounted to swing on a shaft 73 which at one end rests in a bore of the part 76 sitting loose on the upper end of the shaft 2 and at the other end rests in a trestle 77 suitably mounted on the machine frame. The folding lever 70 is moved back and forth by means of the arm 78 and the push rod 79 which is connected with the lever 80. The latter is mounted on a supporting pin 81 of the trestle 82 which is fastened to the machine frame 1. A lever 83 with a roller 84 at its lower end is also hinged to the pin 81. This roller 84 is held by known means as by a spring, not shown, against the periphery of an eccentric member 86 mounted on counter shaft 85. The counter shaft 85 rotates in the auxiliary bearings 87 and 88 and is driven in known manner by means of an intermediary gear from the main driving shaft 19.

The folding plate 72 is pivoted on two pinions 71 and 71a at the lower end of the lever 70. An auxiliary push rod 74 which is resilient and bent off at right angles at its lower end, is also connected to the lever 70, and at its free end is provided with an elastic pressing rail 75 extending somewhat beyond the folding plate 72.

Figure 7:
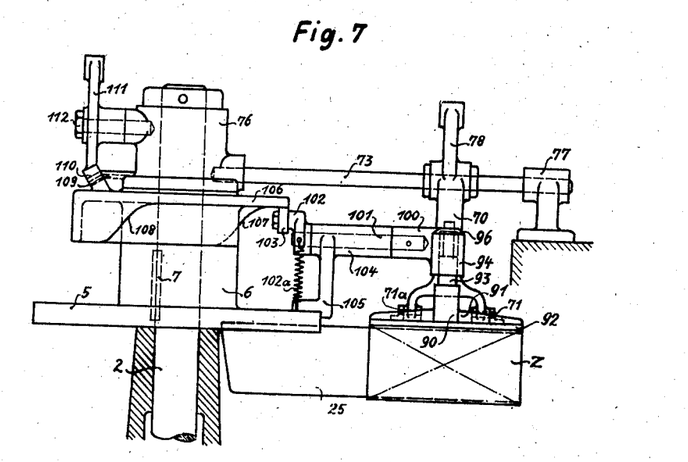
Fig. 7 is a side view, showing a part of the folding device of Figs. 5 and 6, on a larger scale.
Figure 10:
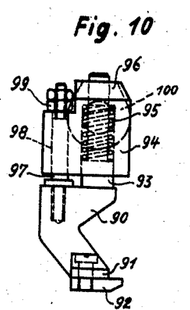
Fig. 10 is a side view, at a larger scale, of the upper pusher which serves to fold the end of the cutting which forms the upper side of the longitudinal bag seam.
Figure 11:
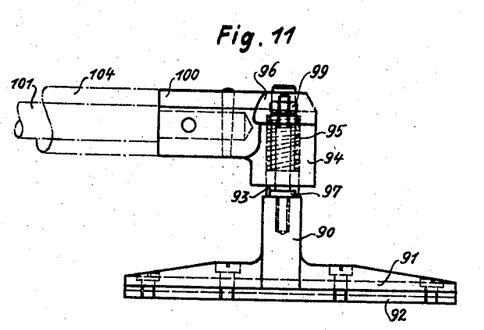
Fig. 11 is a side view of Fig. 10.
Figure 12:
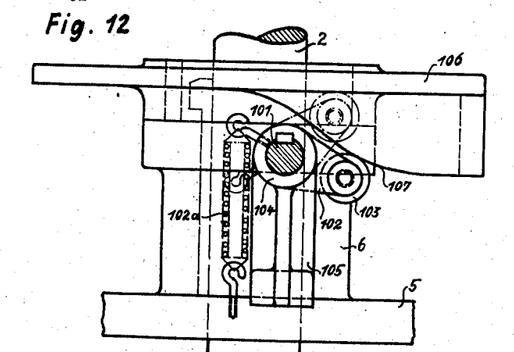
Fig. 12 is an end view at a larger scale, of the mechanism which serves to control the last-named pusher.
Figure 13:
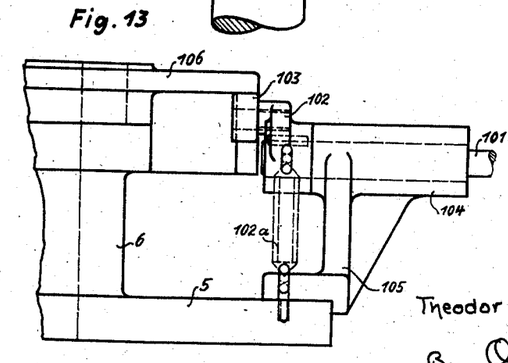
Fig. 13 is a side view on Fig. 12.
Figure 14:
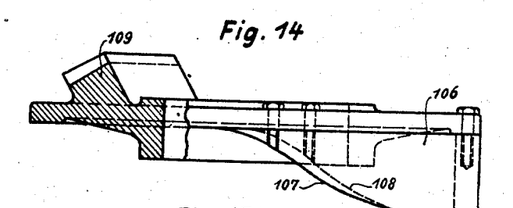
Fig. 14 is a side view, partly in section, of the cam of the mechanism shown in Figs. 12 and 13.
Figure 15:
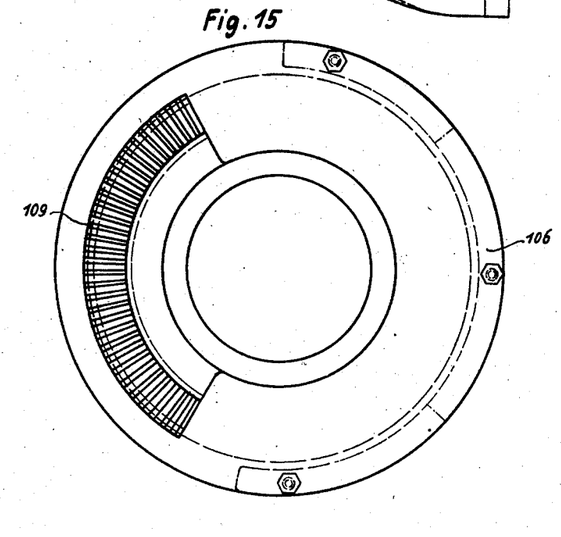
Fig. 15 is a plan view of the cam of Fig. 14
Figure 16:
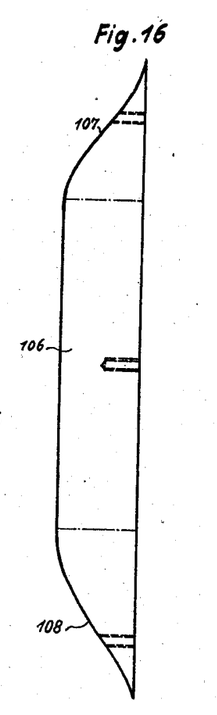
Fig. 16 shows the curve of said disk in diagrammatic view.

The rest of the folders are shaped so as to depress simultaneously the longitudinal seam of the cutting folded tube-fashion around the folding block and in this way obviate the necessity of providing any special mechanism for this purpose. The arrangement and shape of these folders 92 is uniformly as follows:

Each of the folders 92 serving simultaneously for depressing the longitudinal seam is mounted on a central part 90, as best shown in Figs. 10 and 11, to which a ledge 91 is connected below on both sides. The folding and depressing plate 92 is fastened below the ledge 91. A pin 93 is mounted on the upper side of the central part 90 to move freely in a bushing 94 under the action of a spring 95. This spring 95 presses against the chamfered part of the pin 93 with its lower end and against the annular cover of the bushing 94 with its upper end. A guide pin 97 is mounted on the central part 90 in order to prevent the folder from turning. This guide pin 97 sits in a bore hole 98 of a lateral shoulder of the bushing 94 and is provided with an adjustable stop nut 99 with counter nut. The bushing 94 has a lateral hub 100 mounted on a pin 101 which on its other end has a rigid crank 102 with a roller 103, as shown in Figs. 7, 12 and 13. The pin 101 revolves in a bushing 104 which is mounted on the folder wheel 5 by an arm 105. The roller 103 is forced by the spring 102a against the running face of a cam or curved disc 106 mounted to turn on the shaft 2 of the folder wheel 5. The curved disc 106 has two running surfaces arranged at a different level, with the two connecting surfaces 107 and 108, as shown in Figs. 14, 15 and 16. A segmental ratchet 109 is mounted on the upper surface of the curved disc and engages with a gear segment 110 of a two-armed lever 111 mounted to move on a pin 112 which rests in a sleeve-shaped bearing bracket 76. The shaft 73 which, as described above, rests with one end in the bearing bracket or trestle 76 and with the other end in the rigid bearing 77, will prevent turning of the trestle 76 which is loosely seated on the shaft 2. A push rod 113, Fig. 1, serves to move the two-armed lever 111 back and forth. This push-rod 113 at its other end is connected with a lever 114 fastened on a pin 115 which is mounted to turn in a trestle 116. Another lever 117, also hinged to the pin 115, is jointed with a push rod 118 which at its lower end is jointed with a lever 119. The latter is mounted to move on a pin 120 of a trestle 121 which is fixed to the machine frame. The lever 119 has a roller 122 which rests on a cam or eccentric 123 mounted on the auxiliary driving shaft 85.

Figure 8:
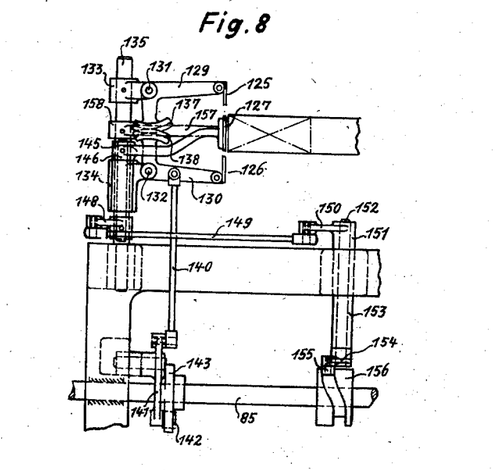
Fig. 8 is a side view of the folding device for forming the bottom of the bag.
Figure 9:
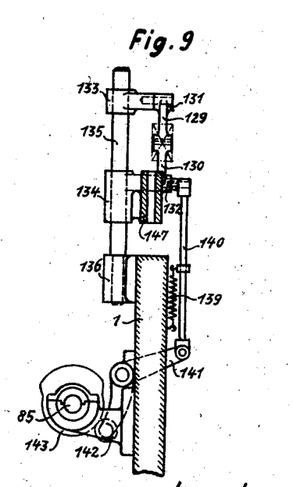
Fig. 9 is an elevation viewed from the left hand side of Fig. 8.

The device for making the bottom of the bag is arranged on station II, as shown in Figs. 4, 8 and 9. It is operated in the generally known manner in that two opposite end parts of the cutting, which protrude beyond the folding block and have been folded tube-shape on station I, are now folded inwardly against the folding block and the two corners formed at right angles to the first folding are then turned over.

The folders 125 and 126 serve for turning the upper and lower end-parts of the bag tube whilst the folder 127 turns over the back corner, as viewed from the feed of the folding block wheel. The front corner is turned over by the stationary folding and pressing bar 128 during the switching of the folding block wheel to station III. The folders 125 and 126 are fastened to angle levers 129 and 130 which are connected with the bushings 133 and 134 by bearing pinions 131 and 132. The bushings 133 and 134 are mounted on a rod 135 which rests rigidly in a trestle 136 fixed to the machine frame 1, as shown in Fig. 9. The free ends of the angle levers 129 and 130 are provided with gear segments 137 and 138 in mesh with each other. A push rod 140 moving both levers into the folding position is connected at one end with the lever 130 and at its opposite end with a two-armed lever 141 having at its opposite end a roller 142 which presses against the cam 143 mounted on the counter shaft 85. A spring 139, which at one end is fastened to the push rod 140 and at the other end to the machine frame 1, holds both folding levers 129 and 130 in the swung-out working position as shown in Fig. 8 and also forces the roller 142 against the cam 143. The folding device 127 is fastened to the swing lever 145 which is rigidly connected to the bearing pin 146. The latter can be moved back and forth in the bushing 147 as shown in Fig. 9, by the lever 148 engaging at the bottom. This lever is jointed with a push rod 149 which at its opposite end is jointed with a lever 150 of which the hub 151 is mounted on a bearing pin 152 so as to move in the bushing 153 fastened to the machine frame.

A lever 154 mounted at the lower end of this pin by means of the roller 155 engages the groove of a cam shaped drum 156 mounted on the counter shaft 85. The folding and pressing bar 128 is mounted rigidly on an arm 157 which by means of the bearing support 158, Fig. 8, is mounted on rod 135.

A trestle 160 in which a two-armed lever 161 is mounted to rotate on the bearing pinion 162, is fastened to the machine frame at station III. The two-armed lever 161 has a plate 163 on one end being connected at the other end with a push rod 164 which is fastened to a three-armed operating lever 165. The latter is mounted to turn at 166 on the trestle 160 and at its lower end has a roller 167 which engages with the cam 168 mounted on shaft 85. An upwardly extending arm 169 has a bushing 172 in which a resilient smoothing stamp 170 is supported to move horizontally in known manner, by means of a bearing pinion 171. A stop pin 174 to serve as counter-support, as will be described later, is mounted in a lateral shoulder 173 of the trestle 160.

The station IV is idle.

Referring to Fig. 4, the stations V and VI show two further smoothing stamps for the bottoms, which are of known construction and need not be further explained.

On station VII the finished bag which has been well dried and pressed at the different glued joints, is removed from the folding block. This may be effecteed by means of the known stripping device shown in Figs. 3 and 4. The hook- shaped members 180, 181 which are fastened to short levers 182, 183, are moved against the sides of the folding block. A spring 186 tends to hold the hooks in the inner position shown in Fig. 4. The levers 182, 183 turn on the buckles or pins 184, 185, which are mounted in two bushings 186$^x$, of which only one is shown on Fig. 3. These bushes are fastened to a sliding bushing 188 with lateral support 187. The bushing 188 is provided with a link 189 in which a sliding block 190 is made to slide. The latter is connected with the operating lever 191 which is mounted to move on shaft 35 and is also connected with an angular two-armed lever 192 upon which are mounted two rollers 193, 194 controlled by the two cams 195, 196. The latter are mounted on shaft 19. The sliding bushing 188 moves back and forth on a sliding rail 197 which is hinged in a trestle 198 fastened to the machine frame. This sliding movement of the bushing is controlled in known manner by a shoulder 199 sliding on a rail 200.

Figure 1:
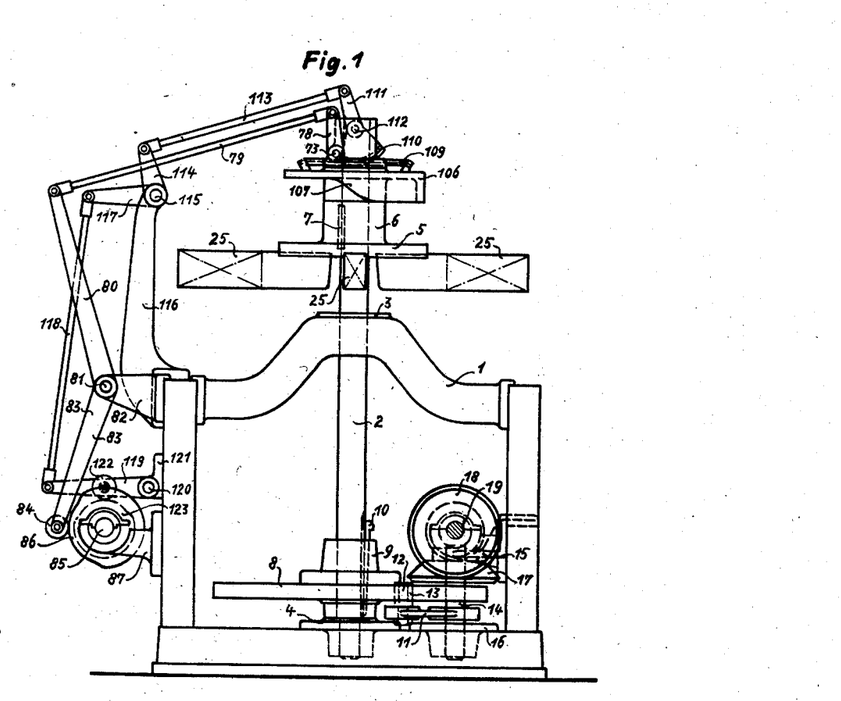
Fig. 1 is a side view of a machine having a number of folding blocks, parts of the machine being omitted.
Figure 2:
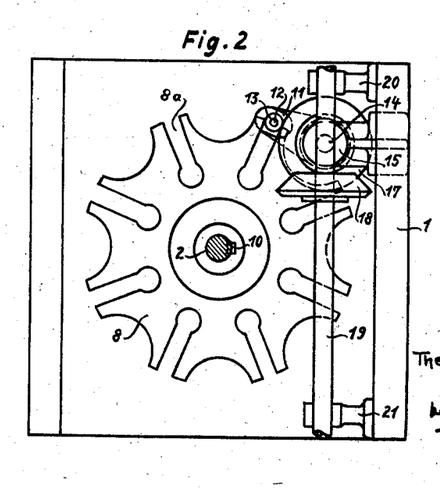
Fig. 2 is a plan view of the mechanism required for driving the wheel on which the folding blocks are mounted.

After a folding block 25 has reached the station I after one switching motion of the folding block wheel 5, the parts of the folding device operative at this station will be in the position shown in Fig. 5. After a paper cutting Z has been conveyed to the table 26, the table with the smoothing plate 27 is moved upwards just below the folding block 25 by means of the pipe 33 and the operating lever 36, the plate 27 pressing the cutting in its central part against the bottom side of the folding block and holding it tight. Simultaneously with the table 26, the two lateral folders 29 and 29a have been moved upwards, as shown in Fig. 1, by means of the operating lever 60, joint 63, yoke 58, guides 55 and 55a and levers 47, 47a, and the stops 48 and 48a move against the stop screws 49 and 49a taking along the supporting member 44 with the guide rail 45. Simultaneously the oil from that part of the pipe 33 above the valve piston 53 of the rod 51 enters through the valve piston 53 into the part of the pipe 33 below the valve piston. The two folding slides 29 and 29a, as will be remembered, are moved upwards in the closed-in position as shown in Fig. 1 and parts Za and Zb projecting on both sides of the central part of the cutting Z which by the plate 27 is pressed against the lower side of the folding block 25 are bent by the indentations 50 and 50a of slides 29 and 29a around the two lower edges of the folding block 25 so that these parts are folded rectangularly upwards against the sides of the folding block. Since the folder 29a is somewhat longer than its counter part 29, the indentation 50a of the folder 29a (see the dotted line in Fig. 5) bends the end Zd, protruding beyond the upper side of the folding block 25, around the neighbouring upper edge of the folding block towards the inside.

Now, the lever 70 with the pusher 72 is advanced towards the edge Zc forming the lower flap of the longitudinal seam of the cutting Z, whereby this edge is turned around the upper edge of the folding block 25. Simultaneously, the auxiliary pusher 74 is somewhat in advance and through the resilient ledge 75 presses the cutting against the folding block below its upper edge.

Then, the folding lever 90 with the pusher 92 swings towards the inside, moving back the pusher 72, and folds the edge Zd of the cutting Z, forming the upper flap of the longitudinal seam, around the upper edge of the folding block, whereby the longitudinal seam of the bag is formed and glued. The folding lever 90 is actuated by the cam 106 which is moved by engagement of its toothed segment 109 with the swinging segment lever 111. Simultaneously, the roller 103 of the crank 102 runs upwards from its position shown in Fig. 5 along the curved pathway 107 and assumes the position shown in Fig. 6, after the folding operation is completed. The folder 92 is somewhat retarded by the thickness of the cutting during the folding operation and the pressure spring 95 is loaded. The longitudinal seam of the cutting now formed is thus held under strong grip of the folder 92 which holds and presses it together. The folding device 92 remains in this gripping position during the switching of the folding block wheel until the finished bag is stripped off, as will be described later.

As soon as the folder 92 has gripped the end Zd of the cutting, the operating lever 60 is swung downwards again, whereby the guide rails 55 and 55a exert a downward pull on the levers 47 and 47a of the supporting member 44. Owing to the braking effect of the oil in the pipe 33 below the valve piston 53 of the rod 51, the folders 29 and 29a by means of the rails 55 and 55a are swung out laterally into the position shown in Fig. 6 until the stops 48 and 48a of the levers 47 and 47a strike against the forked arms of the supporting member 44. Then the parts 29 and 29a are moved back into the lower position while being still spread out and out of contact with the cutting. Meanwhile the operating lever 36 has returned also the table 26 with the pressing plate 27 into the lower position shown in Fig. 5. Only in this lower position of the operating lever 60 ceases the braking effect of the oil upon the bottom side of the valve piston 53. When after the next switching operation of the folding block wheel by the operating lever 36 the folding table is moved upwards again, the oil which has entered above the valve piston 53 will have the opposite effect on the piston so that now the folders 29 and 29a are moved inwards and raised in this position so that a new cutting can be folded.

After the cutting Z has been folded tube-shaped around the folding block 25 on station I, as hereinbefore described, the folding block wheel 5 is moved forward one step by the Maltese drive described above, thus switching the folding block from station I to station II. Here the folding pushers 125, 126, shown in Fig. 8, are successively moved inwards and thereby cause folding of the end-parts of the tube-shape cutting, which project above and below the front edge of the folding block. Then the lateral folding device 127 is inwardly moved by means of its operating lever, thereby turning over the rear bottom corner. At a suitable moment during this folding operation the two folders 125, 126, are returned to their previous positions shown in Fig. 8.

Now the folding block wheel 5 is moved through another step. The lateral folder 127 remains first in its inside position until the end corner of the tube which stands forward in the advancing direction of the folding block wheel, is gripped and turned over by the stationary folding bar 128. The bar 128 reaches as far as station III, as shown in Fig. 4, and exerts a suitable pressure upon the folding of the bottoms so that their profile is made rigid by the glued joints.

After the folding block has been advanced to station III, the longitudinal bag seam is firmly pressed by moving inward the lever 169, Fig. 3. Simultaneously the lever 161 is moved with its plate 163 against the upper end of the pin 93 of the folder 90, forcing it slightly downward. The folding and pressing ledge 92 which is influenced by the spring 95, is thereby given additional pressure which is imparted to the longitudinal seam of the finished package, so that the glued joint connection, depending upon the character of the cutting, can thereby be rendered all the more integral. The stop pin 174 below the folding block serves as counter support. Simultaneously with this smoothing and pressing movement, the bottom stamp 170 is moved against the bottom folding by the movement of the lever 169, whereby the pressure is applied also to the bottom, and an integral connection between the single folds is secured. During the subsequent switching steps of the folding block wheel the bag reaches the stations IV, V, VI and VII. On stations V and VI a pressing device similar to station III repeats the smoothing and pressing of the folds at the bottom. On station VII the bag is stripped from the folding block by means of the pulling hooks 180, 181, already described. As soon as the folding block has arrived on the station, the pulling hooks are moved out of their rest position into the operating position, Fig. 4, by the return movement of the sliding bushing 188, through the operating lever 191. During the stripping operation, the hooks 180, 181 with their ends lying against the two sidewalls of the folding block strike against the front ends of the bag and slide it off the folding block.

Prior to stripping off the finished bag, the roller 103 of the swingable device of the folder 92, which hitherto had pressed the longitudinal seam against the upper side of the folding block, gets into the pathway 108 of the cam 106 and is transported to the lower surface of the cam, with the result that the position according to Fig. 5 is resumed. The distance between the two surfaces 107 and 108 of the cam 106 can be adjusted to suit the requirements of construction of the bag manufacturing machine. Moving to and fro of the cam 106 can also be adjusted by the segment lever 111. Depending upon the thickness of the cuttings, the height of the folding pusher 92 in relation to the axis of the hub 100 can also be adjusted by turning the stop nut 99 of the guide pin 98, so that careful folding of the edge Zd as well as thorough smoothing and pressing of the longitudinal seam may be ensured with any thickness of the cutting.

The method and apparatus of the present invention have been described in detail with reference to specific embodiments. It is to be understood, however, that the invention is not limited by such specific reference but is broader in scope and capable of other embodiments than those specifically described and illustrated in the drawings.

It is also to be understood that the following claims are intended to cover all of the generic and specific features of the invention herein described, and all statements of the scope of the invention which, as a matter of language, might be said to fall therebetween.

I claim:

1. A machine for making bags from a cutting, comprising at least one folding block, a table mounted below the folding block and adapted to be moved up and down and to receive the cutting, two lateral folding members adapted to be moved up and down and sideways outwards and arranged for turning over the ends of the cutting against the sides of the folding block, said folding members being provided with a concave recess at their upper ends.

2. A machine for making bags from a cutting, comprising at least one folding block, a table mounted below the folding block and adapted to be moved up and down and to receive the cutting, two lateral folding members adapted to be moved up and down and sideways outwards and arranged for turning over the sides of the cutting against the sides of the folding block in such manner that one side of the cutting after being turned over projects by a greater length beyond the upper end of the folding block than the second side of the cutting, said folding members being provided at their upper ends with a concave recess and the folding member for one side of the cutting being so much higher than the folding member for the second side of the cutting as to extend with its concave recess slightly beyond the upper edge of the folding block in the position shortly before the end of its rising motion.

3. A machine for making bags from a cutting, comprising a plurality of folding blocks, a plurality of working stations, means for moving the folding blocks successively into operative condition with respect to the successive stations, means for folding the cutting U-shape around the folding block, two folding members arranged above the folding block for turning over the ends of the U-shaped cutting projecting over the upper side of the folding, and means by which the folding member for the end of the cutting which is to be turned over at last, is held in the folding position, after this turning over operation, until the folding blocks are moved on to the next station.

4. A machine for making bags from a cutting, comprising at least one folding block, a table mounted below the folding block and adapted to be moved up and down and to receive the cutting, two lateral folding members adapted to be moved up and down and sideways outwards and arranged for turning over the sides of the cutting against the sides of the folding block, a supporting member and angle levers for mounting the lateral folding members on said supporting member to be swingable between two angular positions, a rod on the upper end of which said supporting member is secured, a pair of guide members engaging lateral arms of the angle levers and adapted to move said supporting member up and down, a tubular member permitting the up and down movement of the table, said rod being guided in the upper portion of said tubular member and reaching with a reduced extension, including a valve piston at its lower end, into the lower portion of said tubular member which includes a braking fluid, whereby said angle levers with their lateral folding members are swung inward into the folding position as said guiding members are raised with respect to the tubular member, while said folding members are swung outward, away from the folding block, as said guiding members are moved downward with respect to the tubular member.

5. A machine for making bags from a cutting, comprising a folding block, means for folding the cutting U-shape around the folding block so that the ends of the cutting project beyond the upper edge of the folding block, folding members for folding the projecting ends into a longitudinal seam, means for operating said folding members, and separate means by which the folding member operating on the end of the cutting forming the upper flap of the longitudinal seam in its folding position is pressed perpendicularly against the longitudinal seam of the bag, after said end has been turned over.

6. A machine for making bags from a cutting, comprising a plurality of folding blocks, means for folding the cutting U-shape around one folding block so that the ends of the cutting extend beyond the upper edge of said folding block, folding members for forming the protruding ends into a longitudinal seam, means for forming the bottom of the bag, means for stripping off the finished bag from the folding block, means for actuating said folding members, and separate means by which the folding member travelling with the folding block which serves to fold the end of the cutting forming the upper flap of the longitudinal seam of the bag, is pressed perpendicularly against the longitudinal seam from its folding position until its position for stripping off the finished bag from the folding block is reached.

7. A machine for making bags from a cutting, comprising at least one folding block, means for folding the end of the cutting U-shape around the folding block so that the ends of the cutting protrude beyond the upper edge of the folding block, folders for forming the protruding ends into a longitudinal seam, and a spring acting upon the folder which serves to fold the end of the cutting forming the upper flap of the longitudinal seam and tending to press this folder in its folding position perpendicularly against the longitudinal seam of the bag.

8. A machine for making bags from a cutting, comprising a plurality of folding blocks, a plurality of stations, means for moving the folding blocks to the various stations in succession, one of said stations including means for folding the cutting U-shape around a folding block so that the lateral ends of the cutting protrude beyond the upper edges of the folding block, a plurality of folders including folders for forming the protruding ends into a longitudinal seam and a folder for folding the end of the cutting forming the upper flap of the longitudinal seam, means for forming the bottom of the bag, means for stripping off the finished bag from the folding block, means for holding said last folder in the holding position until the finished bag is stripped off from the folding block, said last mentioned folder travelling along with the folding blocks, and means acting upon said last mentioned folder and tending to press the folder perpendicularly against the longitudinal seam, and another of said stations including means for exerting pressure on the folder.

9. A machine for making bags from a cutting, comprising a plurality of folding blocks, a plurality of stations, means for moving the folding blocks to the various stations in succession, one of said stations including means for folding the cutting U-shape around a folding block so that the lateral ends of the cutting protrude beyond the upper edges of the folding block, a plurality of folders including folders for forming the protruding ends into a longitudinal seam and a folder for folding the end of the cutting forming the upper flap of the longitudinal seam, means for forming the bottom of the bag, means for stripping off the finished bag from the folding block, said last folder travelling along with the folding block, means for holding these folders in their folding position and to press them perpendicularly against the longitudinal seam of the bag until the finished bag has been stripped off from the folding block, a carrier for the folding blocks, means for swingably mounting said folders on said carrier, a shaft for said carrier and a cam mounted for oscillation on said shaft and adapted to control the inward and outward swinging of said folders.

10. A machine for manufacturing bags from a cutting comprising at least one folding block, a table mounted below the folding block and adapted to be moved up and down and to receive the cutting, two lateral folding members adapted to be moved up and down and laterally outwards for turning over the sides of the cutting against the sides of the folding block, two folding members mounted above the folding block, and means adapted to move the said lateral folding members, after the completion of their upward movement, laterally outwards and away from the folding block and to return the lateral folding members in this outward condition downwards to their initial position.

THEODOR JUNGMAYR.